US012775313B2

(12) United States Patent
Lin et al.

(10) Patent No.: US 12,775,313 B2
(45) Date of Patent: Oct. 27, 2026

(54) ELECTRIC CARD RETAINING DEVICE

(71) Applicant: FOSITEK CORPORATION, New Taipei City (TW)

(72) Inventors: Chun Han Lin, New Taipei City (TW); Che Wei Chang, New Taipei City (TW); Jia Wei Pan, New Taipei City (TW)

(73) Assignee: FOSITEK CORPORATION, New Taipei City (TW)

( * ) Notice: Subject to any disclaimer, the term of this patent is extended or adjusted under 35 U.S.C. 154(b) by 45 days.

(21) Appl. No.: 18/585,816

(22) Filed: Feb. 23, 2024

(65) Prior Publication Data

US 2025/0271912 A1 Aug. 28, 2025

(51) Int. Cl.
*G06F 1/185* (2026.01)

(52) U.S. Cl.
CPC .................................... *G06F 1/185* (2013.01)

(58) Field of Classification Search
CPC ................................ G06F 1/185; H05K 1/144
See application file for complete search history.

(56) References Cited

U.S. PATENT DOCUMENTS 10,234,913 B1 * 3/2019 Kho ......................... H05K 3/36
10,299,397 B1 * 5/2019 Chen .................... H05K 7/1429

* cited by examiner

*Primary Examiner* — James Wu
(74) *Attorney, Agent, or Firm* — Rosenberg, Klein & Lee

(57) ABSTRACT

An electronic card retaining device includes a seat mounted on a motherboard and a movable retaining member. The seat is provided with a stopper section and a guide section; the movable retaining member has an elastic arm corresponding to the stopper section and a mating guide section for engaging with the guide section. When the movable retaining member is assembled to the seat, the elastic arm can be pressed against the stopper section and elastically deformed; and the guide section and the mating guide section can engage with each other to guide the movable retaining member to elastically displace on the seat relative to an electronic card between a retaining position and a release position. With the above arrangements, the electronic card retaining device so formed is structurally simplified and easily operable for conveniently, securely and elastically retaining or releasing the electronic card to or from the motherboard.

12 Claims, 8 Drawing Sheets

ELECTRIC CARD RETAINING DEVICE

FIELD OF THE INVENTION

The present invention relates to an electronic card retaining device, and more particularly, to a structurally simplified, easily operable and low production cost device for retaining an electronic card (such as a solid state drive) in place on a motherboard.

BACKGROUND OF THE INVENTION

The conventional solid state drive (SSD) uses mSATA standard, which has limited overall capacity because the number of flash memories that can be provided on the printed circuit board (PCB) is limited. Therefore, a more recent standard named Next Generation Form Factor (NGFF) or M.2 is developed for using with solid state drive. Since M.2 standard allows flash memory chips to be provided on both sides of the circuit board, it has advantages like smaller volume, higher capacity, and lower manufacturing cost, compared to the conventional mSATA standard.

General solid state drive with M.2 standard has various length specifications available for choosing, and the motherboard for a computer may also be designed to allow for solid state drive of different length specifications. In response to the need of holding solid state drives of different length specifications in place, in most cases, the solid state drives with M.2 standard are fastened to the computer motherboard by screws and bolts. However, the use of screws and bolts as fastening means will cause a lot of inconveniences in assembling and disassembling the solid state drives to and from the motherboard. Further, bolts must be embedded in the computer motherboard for the screws to fasten thereto. This would inevitably result in increased manufacturing cost.

Taiwan Patent Pub. No. 1568334 discloses an assembling fastener structure, which includes a loading section, a pivotally connecting section, a protruding section, and a retaining and pressing section. The loading section includes a loading surface and a back surface opposing to the loading surface. The pivotally connecting section and the protruding section are projected from the back surface and the loading surface of the loading section, respectively, to extend along an axial direction of the pivotally connecting section. The retaining and pressing section is radially protruded from one side of the protruding section to extend along a radial direction of the pivotally connecting section, so that the retaining and pressing section and the loading section together form a retaining groove between them, and a release opening not covered by the retaining and pressing section is formed at a diametrically opposite side of the retaining groove.

To use the above assembling fastener structure, the pivotally connecting section can be correspondingly inserted into one of many mounting holes provided on a computer motherboard depending on the actual specification and size of the solid state drive. Then, a tool such as a slotted screwdriver is extended into an operating slot pre-formed on the protruding section to turn the protruding section of the assembling fastener structure until one of the opposing retaining groove and release opening is oriented to the solid state drive, so as to set the assembling fastener structure to a locking or a releasing state. When using the above assembling fastener structure, a specific tool, i.e. the slotted screwdriver, is necessitated to operate the assembling fastener structure. Meanwhile, it is labor-consuming to turn the protruding section, so that the assembling fastener structure is not convenient for use.

China Utility Model Patent Pub. No. CN 209390455U discloses a tool-free grounded quick fastener, which includes a male fastening part and a female fastening part. The female fastening part includes a main body provided with an interference sleeve for inserting into a fixing hole on a circuit board. The interference sleeve has a retaining hole provided on a top thereof, and a metal grounding clip is connected to an outer periphery of the retaining hole. The male fastening part is provided with a pressing section with a pin projected from a center thereof. And, the pressing section and the main body have at least one flexibly bendable connecting belt provided between them.

To use the above tool-free grounded quick fastener, the pin on the male fastening part is inserted into the retaining hole on the female fastening part, and the pressing section of the male fastening part is pressed on against a notch formed on an edge of the M.2 card (i.e. the solid state drive), so as to ground and locate the M.2 card in place. Since this tool-free grounded quick fastener has a complicated overall structure and is uneasy to fabricate, it is not economically suitable for use with components of low unit cost.

Further, China Patent Pub. No. CN 109659727A discloses a fastening device assembly, which includes a main body mounted to a circuit board and internally receiving at least one retaining member, which is provided on one lateral side with a lodging section. The main body is internally provided with an elastic plate or an elastic member for pressing against the retaining member, so that the retaining member is flexibly stretchable and skewable.

In practical application of the above conventional fastening device assembly, an electronic card (such as a solid state drive) may have its one edge directly pressed downward from a top of the retaining member, so that the retaining member is elastically compressed and skewed while the lodging section is retained to the outer side of the notch provided on the edge of the electronic card (i.e. the solid state drive), so that the electronic card can be easily located in place with simple operation. However, the above fastening device assembly has relatively complicated structure and can not be easily assembled. Therefore, it is not economically suitable for use with components of low unit cost.

In view that the conventional electronic card (e.g. a solid state drive) retaining device has the above disadvantages in practical application thereof, it is tried by the inventor to develop an improved electronic card retaining device to overcome the above disadvantages.

SUMMARY OF THE INVENTION

A primary object of the present invention is to provide an electronic card retaining device, which includes a seat mounted on a motherboard and a movable retaining member assembled to the seat. A stopper section, an elastic arm located opposite to the stopper section, a guide section, and a mating guide section corresponding to the guide section are provided between the seat and the movable retaining member. The mating guide section is engaged with the guide section to drive the movable retaining member to elastically displace relative to an electronic card between a retaining position and a release position. When the movable retaining member is subjected to an external force to move from an initial position, i.e. the retaining position, to the release position, the movable retaining member is brought to move out of the position capable of retaining the electronic card in place while the elastic arm is stopped by the stopper section to become elastically deformed and store an elastic restoring force; and when the movable retaining member is released from the external force applied thereto, the elastic arm is driven by the stored elastic restoring force to displace the movable retaining member from the release position back to the electronic card retaining position. With the above arrangements, the electronic card retaining device so formed has simplified structure and is easy to operation.

Another object of the present invention is to provide the above described electronic card retaining device, the stopper section of which is provided on one side facing toward the elastic arm with a bevel guiding surface. When the elastic arm is stopped by the bevel guiding surface of the stopper section from moving any further to become elastically deformed and store the elastic restoring force, the bevel guiding surface enables the mating guide section to produce a vertical elastic action force relative to a displacement path of the guide section. The vertical elastic action force effectively eliminates any gap between the engaged guide section and mating guide section, and prevents the seat and the movable retaining member from loosened connection between them to adversely affect the retaining effect of the electronic card retaining device.

To achieve the above and other effects, the technical means adopted by the present invention is to provide an electronic card retaining device, which includes a seat mounted on a motherboard and a movable retaining member assembled to the seat. A stopper section, an elastic arm located opposite to the stopper section, a guide section, and a mating guide section corresponding to the guide section are provided between the seat and the movable retaining member. The mating guide section is engaged with the guide section to drive the movable retaining member to elastically displace between a retaining position and a release position relative to the electronic card. The elastic arm can be provided on one of the seat and the movable retaining member while the stopper section is provided on the other one of the seat and the movable retaining member. When the movable retaining member is subjected to an external force to move from an initial position, i.e. the retaining position, to the release position, the movable retaining member is brought to move out of the position capable of retaining the electronic card in place while the elastic arm is stopped by the stopper section to become elastically deformed and store an elastic restoring force; and when the movable retaining member is released from the external force applied thereto, the elastic arm is driven by the stored elastic restoring force to displace the movable retaining member from the release position back to the electronic card retaining position.

In the above described electronic card retaining device, the stopper section has a bevel guiding surface provided on one side facing toward the elastic arm.

In a first embodiment of the above described electronic card retaining device, the movable retaining member includes a receiving space for receiving the elastic arm and the stopper section therein; the mating guide section includes two elongate guide slots located at two lateral sides of the receiving space, and the elongate guide slots are extended along an elastic displacement direction of the movable retaining member relative to the seat; the guide section includes two elastic plates located at two lateral sides of the seat corresponding to the elongate guide slots, and the elastic plates respectively have a hooked portion correspondingly extending into the elongate guide slots. The elongate guide slots guide and limit the hooked portions to displace in a predetermined direction and by a predetermined distance, such that the movable retaining member can be assembled to the seat and be guided and limited to an elastic displacement path.

In a second embodiment of the above described electronic card retaining device, the seat includes a receiving space for receiving the stopper section and the elastic arm therein; the guide section includes two elongate lateral extended sections located at two lateral sides of the receiving space, and the lateral extended sections are extended along an elastic displacement direction of the movable retaining member relative to the seat and respectively have a projected section vertically extended downward from a middle section thereof; the mating guide section includes two horizontal guide grooves provided on two lateral sides of the movable retaining member corresponding to the lateral extended sections. The two horizontal guide grooves respectively receive one of the two lateral extended sections and have a vertically extended lower cut for receiving the projected sections therein, and the two lower cuts respectively have a width larger than that of the projected sections; such that the horizontal guide grooves form a displacement guide of the lateral extended sections and the lower cuts limit a displacement distance of the projected sections, and the movable retaining member can be limited and assembled to the seat while being guided by and limited to an elastic displacement path.

In the present invention, the electronic card to be retained in place has two ends, one of which is an engaging end and the other of which is an electrical connecting end. The electrical connecting end is electrically connected to a terminal block provided on the motherboard, and the engaging end is provided on an edge thereof with a locating notch. The movable retaining member is provided on one side facing toward the electronic card with a locating protrusion corresponding to the locating notch and the locating protrusion has a pressing section provided above it and projecting toward the electronic card. Further, the pressing section has a bevel surface facing toward the locating notch of the electronic card.

The structure and the technical means adopted by the present invention to achieve the above and other objects can be best understood by referring to the following detailed description of the preferred embodiments and the accompanying drawings, wherein:

DETAILED DESCRIPTION OF THE PREFERRED EMBODIMENTS

Figure 1:
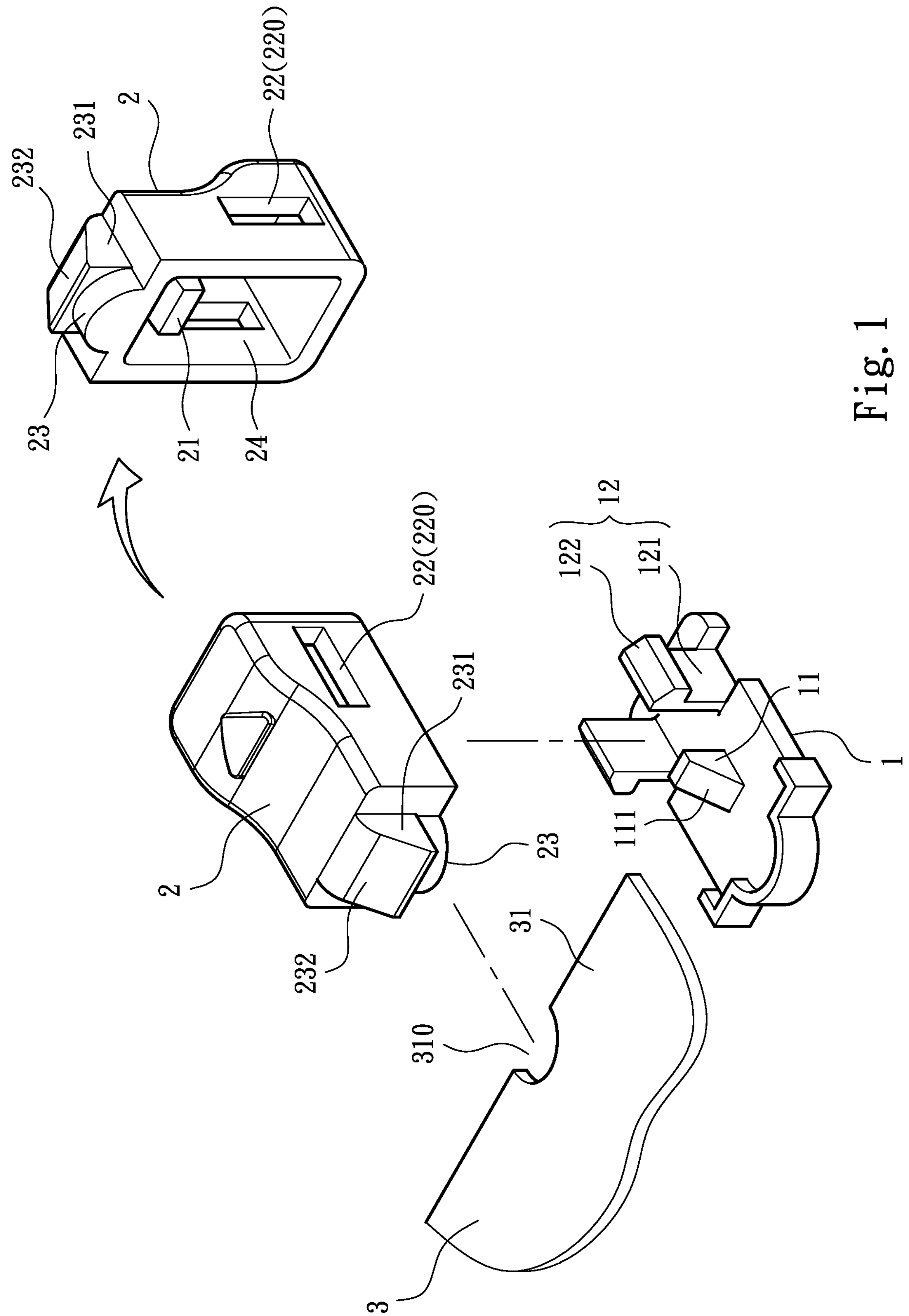
FIG. 1 is an exploded perspective view of an electronic card retaining device according to a first embodiment of the present invention.
Figure 3:
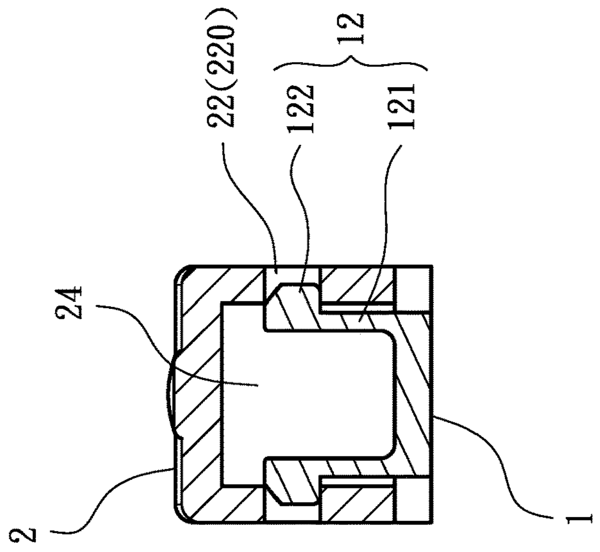
FIG. 3 is a sectional view taken along line A-A of FIG. 2.
Figure 2:
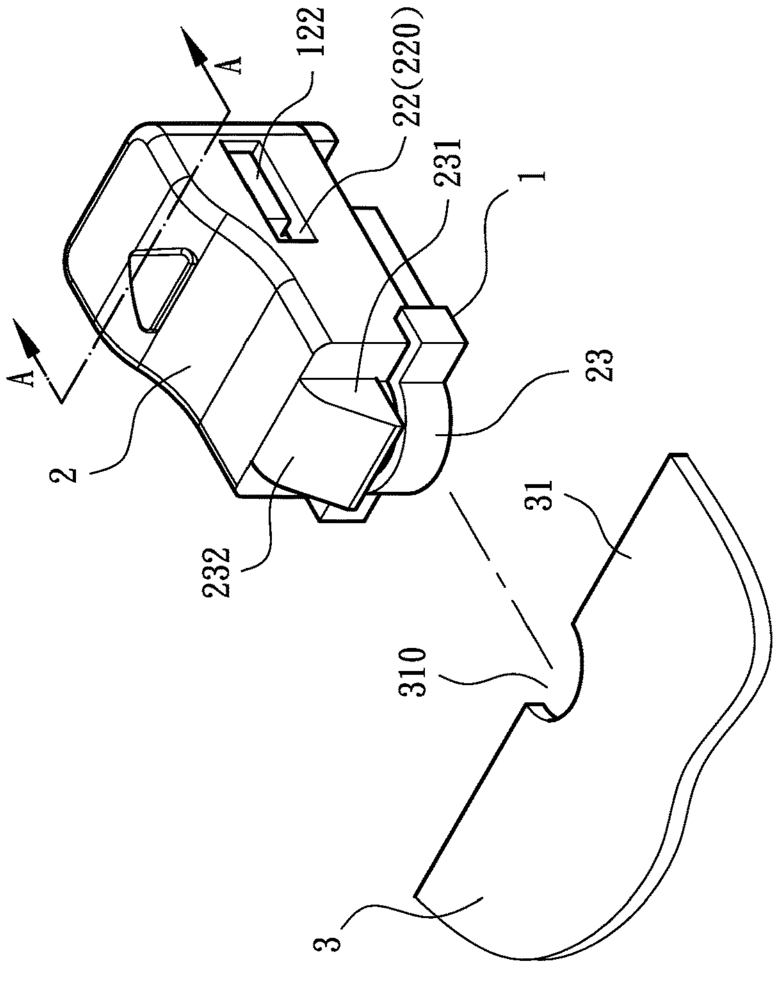
FIG. 2 is an assembled perspective view of the electronic card retaining device according to the first embodiment of the present invention.

Please refer to FIGS. 1 to 7. As shown, an electronic card retaining device according to a first embodiment of the present invention includes a seat 1 and a movable retaining member 2. The seat 1 may be glued, welded or connected using other elements to a motherboard 30 near a position for mounting an electronic card 3, which may be, for example, a solid-state drive. On the seat 1, there are provided a stopper section 11 and a guide section 12.

Figure 4:
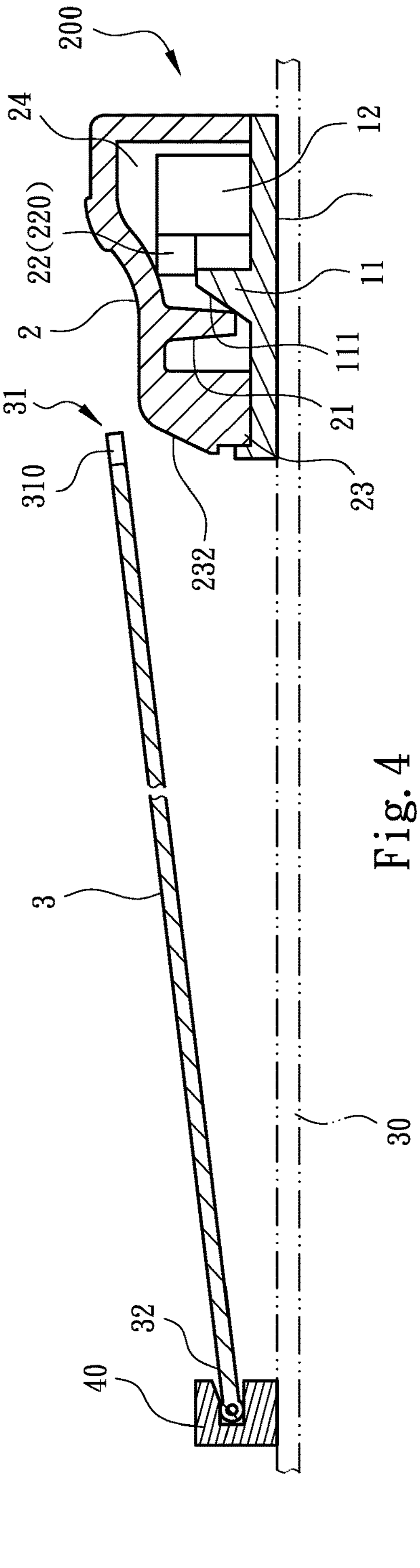
FIG. 4 is a first sectional side view showing the use of the electronic card retaining device according to the first embodiment of the present invention before an electronic card is held in place by a movable retaining member.
Figure 6:
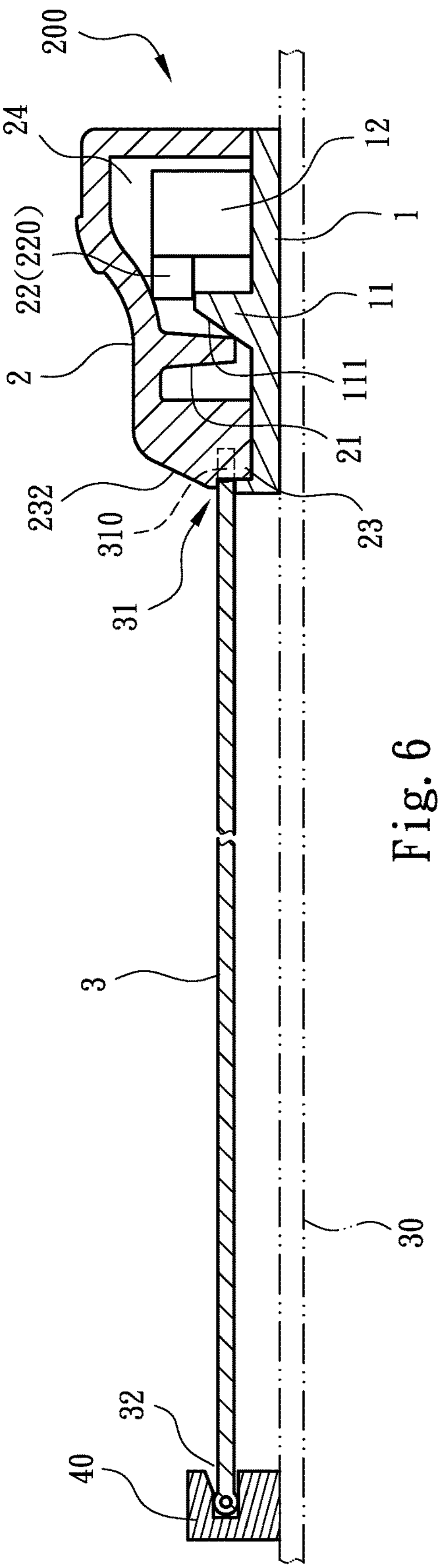
FIG. 6 is a third sectional side view showing the use of the electronic card retaining device according to the first embodiment of the present invention after the electronic card is held in place by the movable retaining member.
Figure 7:
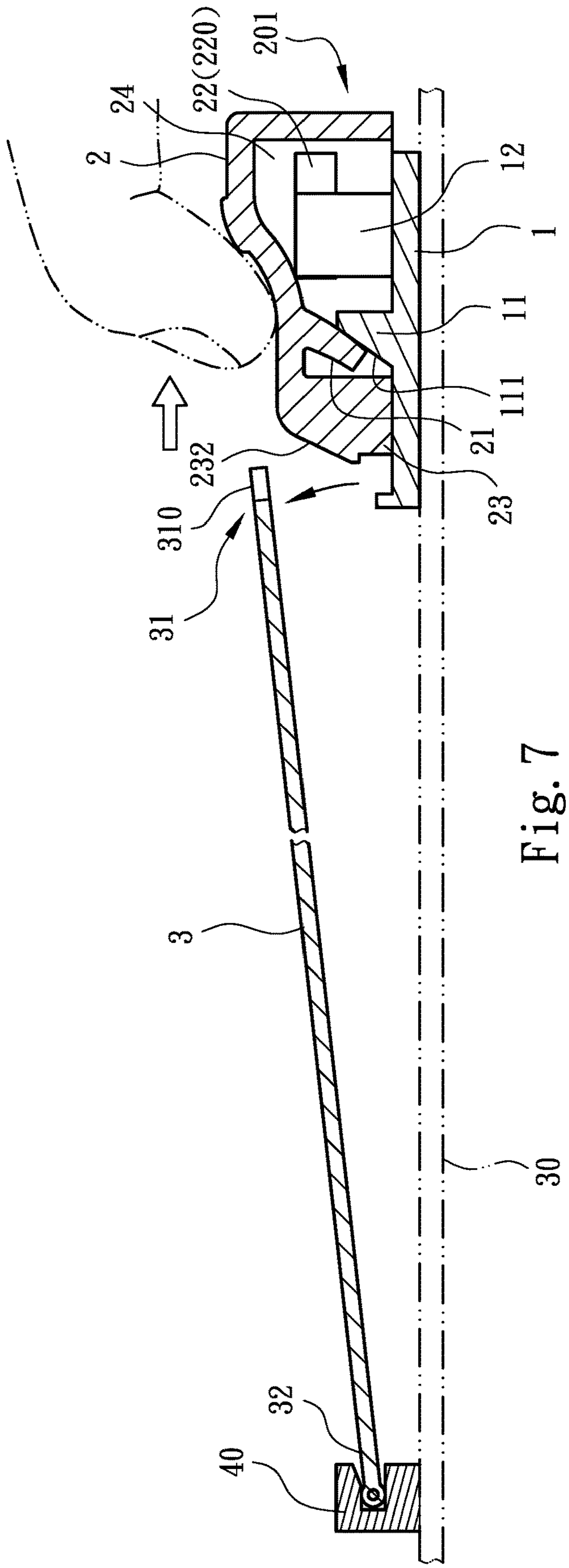
FIG. 7 is a fourth sectional side view showing the use of the electronic card retaining device according to the first embodiment of the present invention, wherein the electronic card is released from the movable retaining member.
Figure 8:
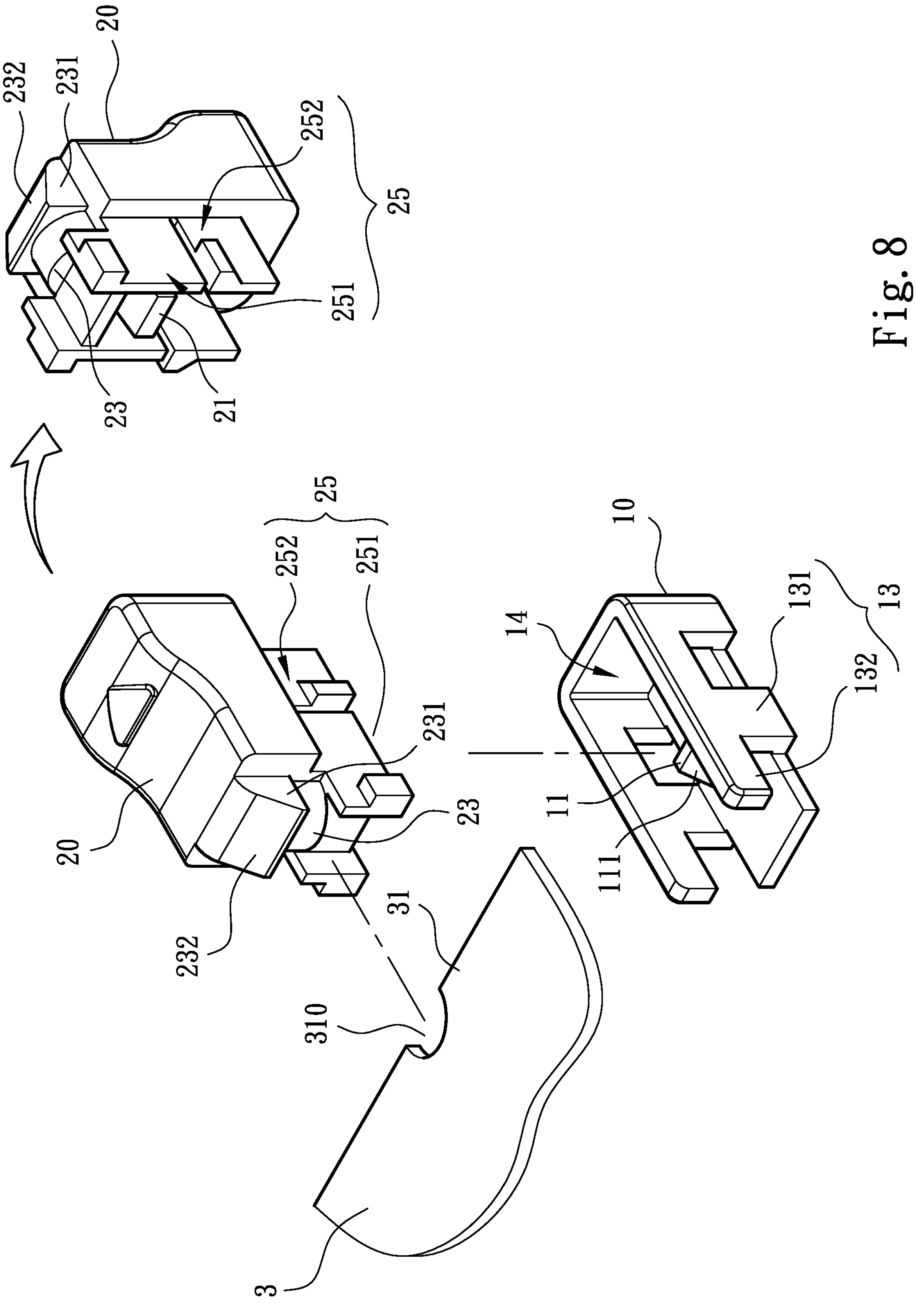
FIG. 8 is an exploded perspective view of an electronic card retaining device according to a second embodiment of the present invention.
Figure 10:
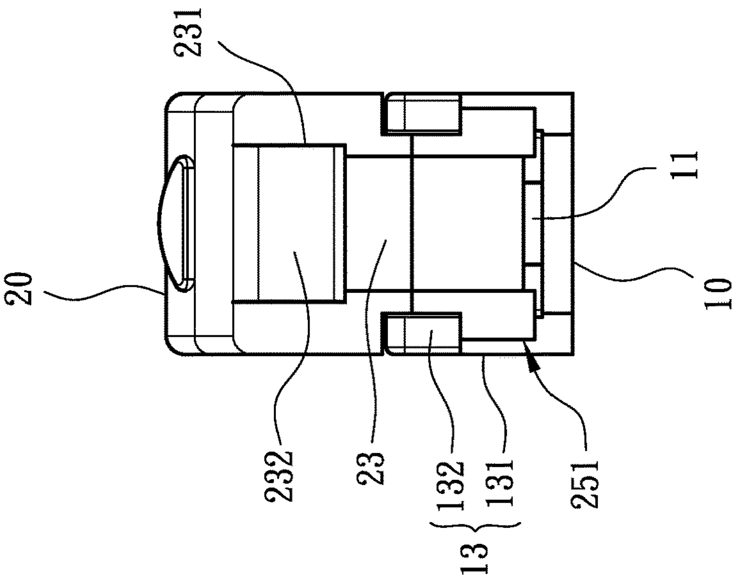
FIG. 10 is a front view of the movable retaining member of FIG. 9 facing toward a direction the same as a moving direction of the movable retaining member.
Figure 9:
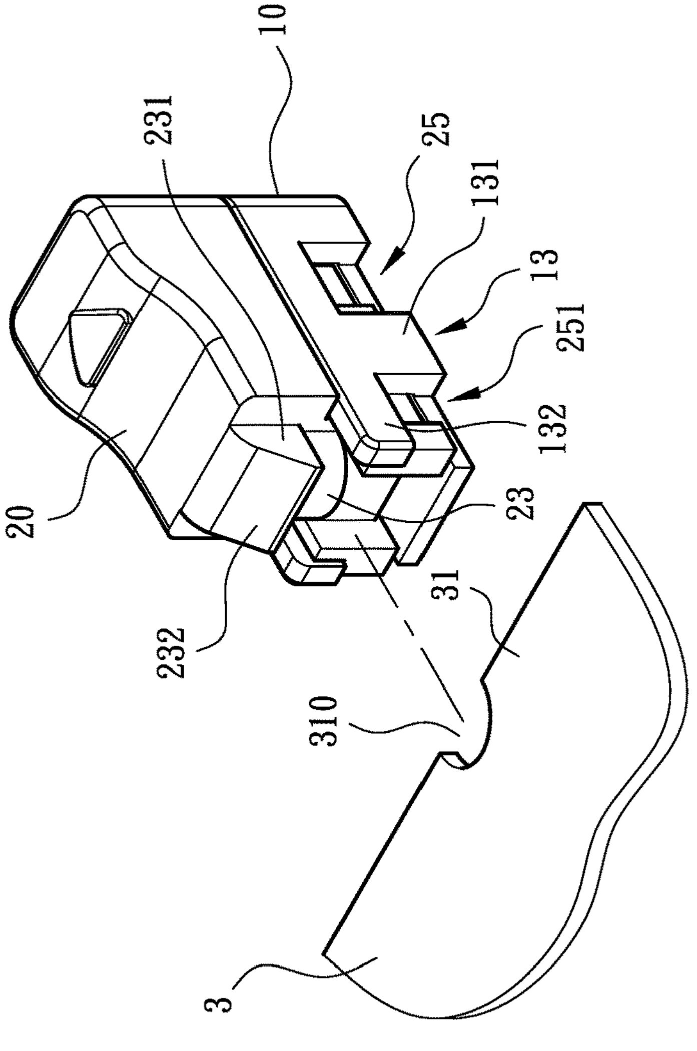
FIG. 9 is an assembled perspective view of the electronic card retaining device according to the second embodiment of the present invention.

The movable retaining member 2 is assembled to the seat 1 and includes a mating guide section 22. The mating guide section 22 can engage with the guide section 12, such that the movable retaining member 2 can move on the seat 1 relative to the electronic card 3 along an elastic displacement path extended between a retaining position 200 (as shown in FIGS. 4 and 6) and a release position 201 (as shown in FIG. 7). The movable retaining member 2 has an elastic arm 21, which is provided on one side of the movable retaining member 2 facing toward the seat 1 and is located corresponding to the stopper section 11. The stopper section 11 is located in the displacement path, along which the elastic arm 21 and the movable retaining member 2 elastically displaces. In addition, the stopper section 11 has a bevel guiding surface 111 formed on one side of the stopper section 11 facing toward the elastic arm 21.

According to the illustrated first embodiment, when the movable retaining member 2 and the seat 1 are in an assembled state, a receiving space 24 is defined between the movable retaining member 2 and the seat 1 for receiving the elastic arm 21 and the stopper section 11 therein. The mating guide section 22 includes two elongate guide slots 220 formed on two lateral sides of the receiving space 24 near middle sections thereof. The elongate guide slots 220 are symmetrically extended in a direction along which the movable retaining member 2 elastically displaces relative to the seat 1.

The guide section 12 may include two elastic plates 121 provided on two lateral sides of the seat 1 at locations corresponding to the two elongate guide slots 220. The two elastic plates 121 respectively include a hooked portion 122 for extending into the elongate guide slots 220, such that the elongate guide slots 220 serve to guide the hooked portions 122 to displace in a predetermined direction and limit a travel distance of the hooked portions 122. With these arrangements, the movable retaining member 2 is limited and assembled to the seat 1 to move along the elastic displacement path.

In the illustrated first embodiment, the electronic card 3 has an engaging end 31, which is provided with a locating notch 310; and the movable retaining member 2 is provided on one side facing toward the electronic card 3 with a locating protrusion 23 at a position corresponding to the locating notch 310. A pressing section 231 projecting toward the electronic card 3 is formed on the movable retaining member 2 above the locating protrusion 23; and the pressing section 231 includes a bevel surface 232 facing in a direction of pushing electronic card (i.e. facing toward the locating notch 310 on the electronic card 3).

Figure 5:
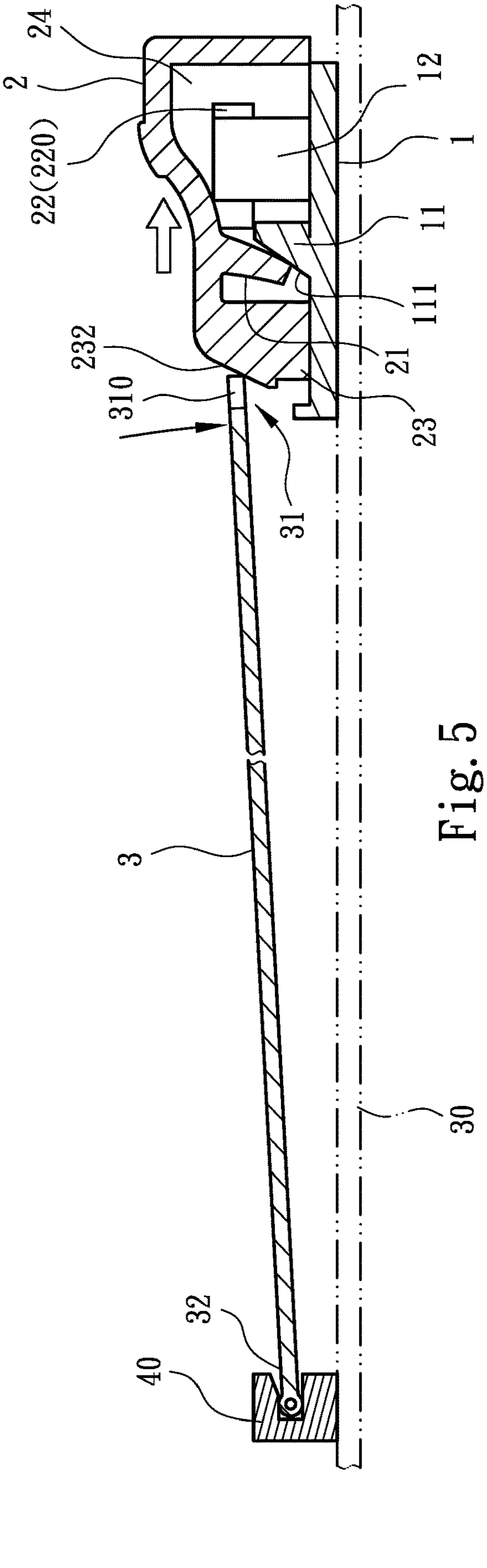
FIG. 5 is a second sectional side view showing the use of the electronic card retaining device according to the first embodiment of the present invention, wherein the electronic card pushes against the movable retaining member when being installed.

In practical application of the present invention, the electronic card 3 is assembled to the motherboard 30 by plugging a pinned electrical connecting end 32 thereof into a terminal block 40 on the motherboard 30. At this point, the engaging end 31 of the electronic card 3 having the locating notch 310 is in an elastically upward extended state, and the movable retaining member 2 is located at an initial position 200 (i.e. the retaining position 200 without retaining the electronic card 3 thereto), as shown in FIG. 4. A user may push the electronic card 3 downward directly so that the engaging end 31 of the electronic card 3 gradually contacts with and presses against the bevel surface 232 to slide downward along the bevel surface 232, causing the movable retaining member 2 to move backward away from the electronic card 3 and displace toward the release position 201. Finally, the locating protrusion 23 and the pressing section 231 of the movable retaining member 2 are displaced to a position closer to the engaging end 31 of the electronic card 3 or an edge of the locating notch 310, as shown in FIG. 5.

While the movable retaining member 2 displaces gradually, the elastic arm 21 is elastically bent when it is finally in contact with and stopped by the bevel guiding surface 111 from moving any further. Meanwhile, the bent elastic arm 21 stores an elastic restoring force that allows the displaced movable retaining member 2 to return to the initial position 200. Since the elongate guide slots 220 on the mating guide section 22 engaged with the hooked portions 122 of the guide section 12 on the seat 1 are limited to displace only in a direction defined by the hooked portions 122, the movable retaining member 2 can move relative to the electronic card 3 only along the allowed displacement path between the retaining position 200 and the release position 201. A vertical elastic action force occurs when the elastic arm 21 is stopped from moving further by the bevel guiding surface 111 of the stopper section 11. This vertical elastic action force also enables the elongate guide slots 220 to more tightly engage with the hooked portions 122 in a lateral direction and accordingly, effectively eliminates any possible loosened connection of the movable retaining member 2 to the seat 1.

When the electronic card 3 is kept pressed downward, the movable retaining member 2 is accordingly continuously displaced rearward relative to the seat 1 until the locating notch 310 on the electronic card 3 is engaged with the locating protrusion 23. At this point, the stored elastic restoring force of the elastic arm 21 enables the movable retaining member 2 to displace in a reverse direction toward the initial position 200 until the pressing section 231 is abutted on a location above the edge of the electronic card 3 having the locating notch 310, as shown in FIG. 6. Since the pressing section 231 is firmly abutted on the edge of the electronic card 3 having the locating notch 310, the electronic card 3 is retained in place by the pressing section 231. Besides, the engagement of the locating protrusion 23 with the locating notch 310 further provides a sideward stabilizing effect to the electronic card 3, so as to avoid any undesired sideward offset of the electronic card 3 relative to the movable retaining member 2 to cause any error in the electrical connection at the electrical connecting end 32 of the electronic card 3.

On the other hand, to release the electronic card 3 that has been retained to the motherboard 30, a force can be externally applied to the movable retaining member 2, such that the movable retaining member 2 is displaced from the retaining position 200 toward the release position 201. Meanwhile, the locating protrusion 23 and the pressing section 231 are moved out of the locating notch 301 of the electronic card 3, and an elastic force applied by the terminal block 40 to the electrical connecting end 32 brings the engaging end 31 of the electronic card 3 having the locating notch 310 provided thereat to elastically lift to a position allowing the electronic card 3 to be easily removed from the electronic card retaining device, as shown in FIG. 7.

It is understood that in the practical implementation of the present invention, the stopper section 11 can be otherwise provided on the movable retaining member 2 while the elastic arm 21 is provided on the seat 1 corresponding to the stopper section 11 to achieve the above-described effect.

Please refer to FIGS. 8 to 14. As shown, an electronic card retaining device according to a second embodiment of the present invention includes a seat 10 and a movable retaining member 20. The seat 10 may be glued, welded or connected using other elements to the motherboard 30 near a position for mounting an electronic card 3. On the seat 10, there are provided a stopper section 11 and a guide section 13.

Figure 11:
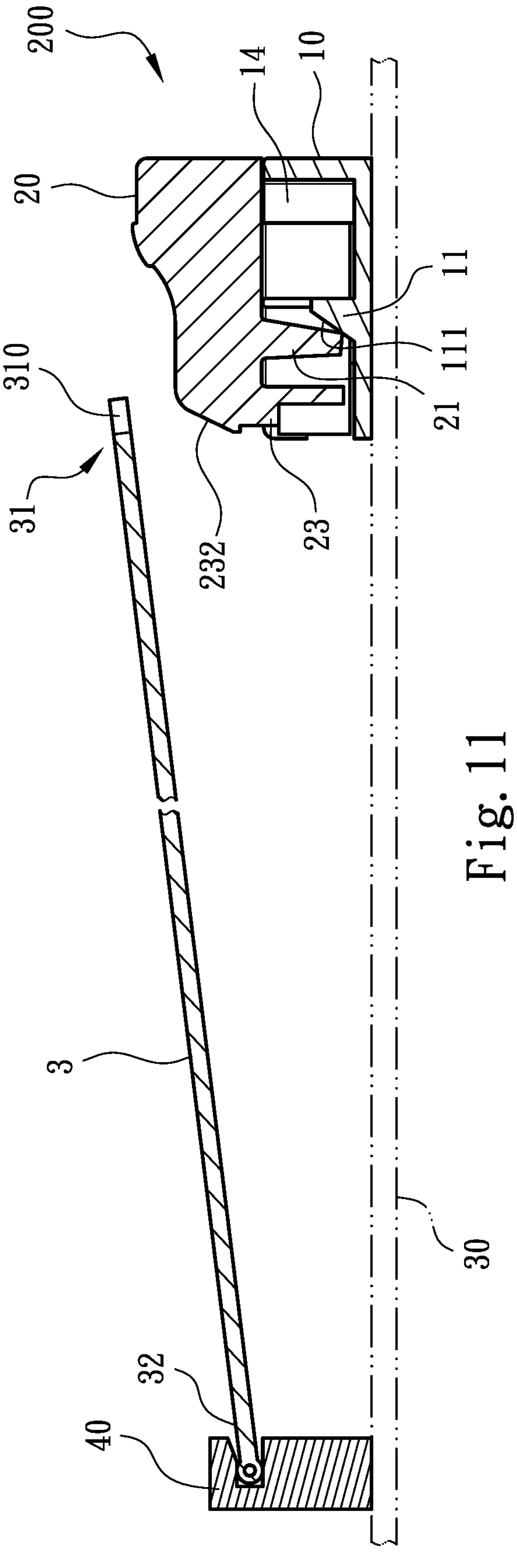
FIG. 11 is a first sectional side view showing the use of the electronic card retaining device according to the second embodiment of the present invention before an electronic card is held in place by a movable retaining member.
Figure 13:
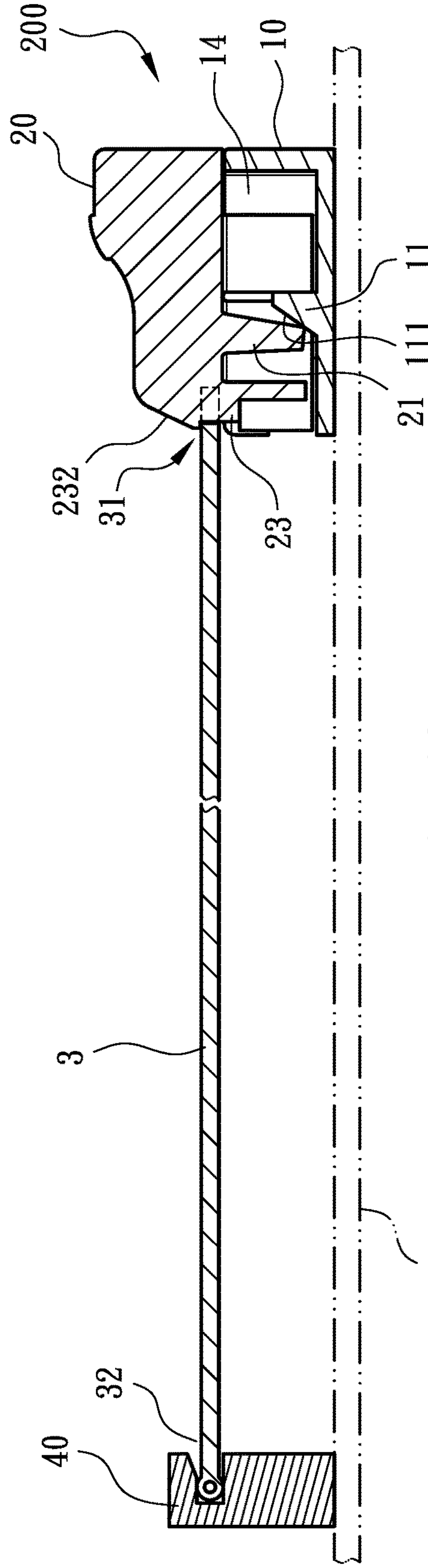
FIG. 13 is a third sectional side view showing the use of the electronic card retaining device according to the second embodiment of the present invention after the electronic card is held in place by the movable retaining member.
Figure 14:
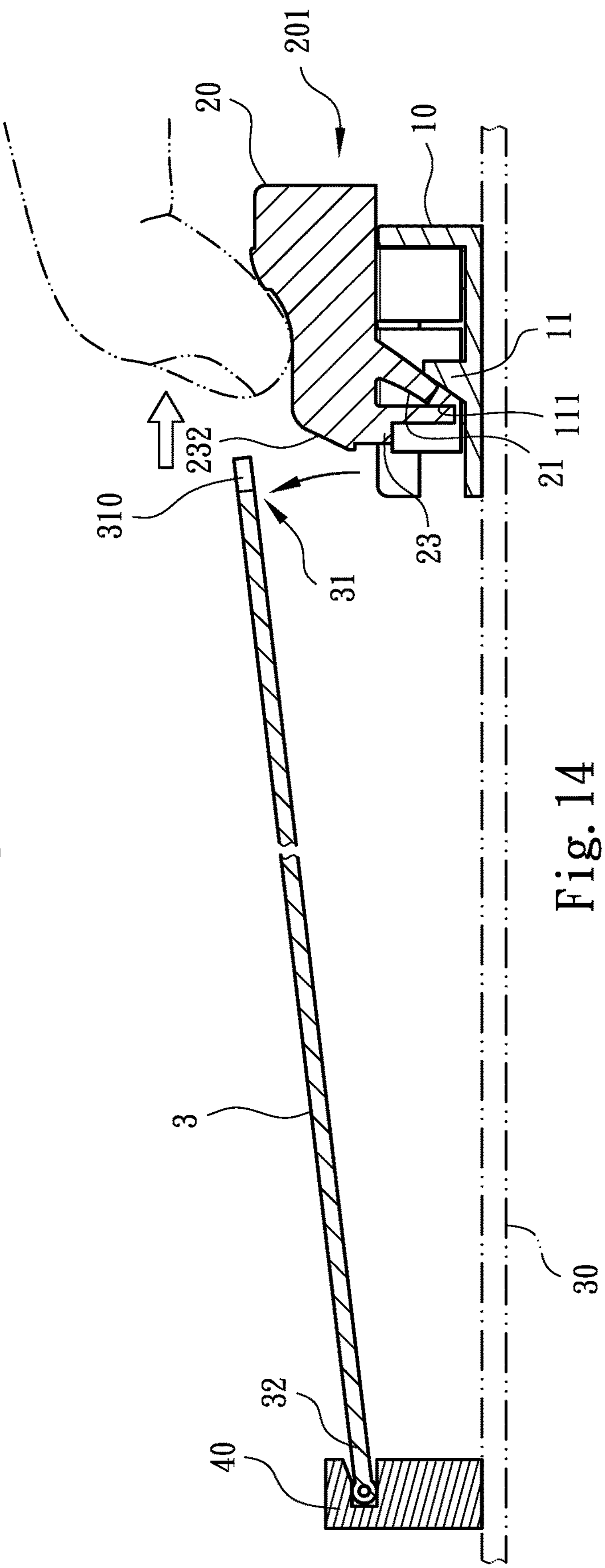
FIG. 14 is a fourth sectional side view showing the use of the electronic card retaining device according to the second embodiment of the present invention, wherein the electronic card is released from the movable retaining member.

The movable retaining member 20 is assembled to the seat 10 and includes a mating guide section 25. The mating guide section 25 can engage with the guide section 13, such that the movable retaining member 20 can move on the seat 10 relative to the electronic card 3 along an elastic displacement path extended between a retaining position 200 (as shown in FIGS. 11 and 13) and a release position 201 (as shown in FIG. 14). The movable retaining member 20 has an elastic arm 21, which is provided on one side of the movable retaining member 20 facing toward the seat 10 and is located corresponding to the stopper section 11. The stopper section 11 is located in the displacement path, along which the elastic arm 21 and the movable retaining member 20 elastically displaces. In addition, the stopper section 11 has a bevel guiding surface 111 formed on one side of the stopper section 11 facing toward the elastic arm 21, and the movable retaining member 20 is provided on one side facing toward the electronic card 3 with a locating protrusion 23 corresponding to a locating notch 310 on the electronic card 3. A forward projected pressing section 231 is provided above the locating protrusion 23 and includes a bevel surface 232 facing in a direction of pushing electronic card (i.e. facing toward the locating notch 310 on the electronic card 3).

In the second embodiment, the seat 10 has a receiving space 14 for receiving the stopper section 11 therein. When the movable retaining member 20 is assembled to the seat 10, the elastic arm 21 is also received in the receiving space 14. The guide section 13 has an elongate lateral extended section 132 provided on each of two lateral sides of the receiving space 14. The elongated lateral extended sections 132 extend in a direction the same as the elastic displacement direction of the movable retaining member 20 relative to the seat 10. The guide section 13 further has a projected section 131 vertically extended downward from a middle section of each of the two lateral extended sections 132.

The mating guide section 25 includes a horizontal guide groove 252 provided on each of two lateral sides of the movable retaining member 20 corresponding to the extended sections 132. The two horizontal guide grooves 252 respectively receive one of the two lateral extended sections 132 and respectively have a vertically extended lower cut 251 for receiving the projected sections 131 therein. The lower cuts 251 respectively have a width larger than that of the projected sections 131, such that the horizontal guide groove 252 forms a movement guide of the two lateral extended sections 132 while the lower cuts 251 respectively form a movement guide of the projected sections 131. With these arrangements, the movable retaining member 20 is assembled to the seat 10 and be limited to move along the elastic displacement path.

Figure 12:
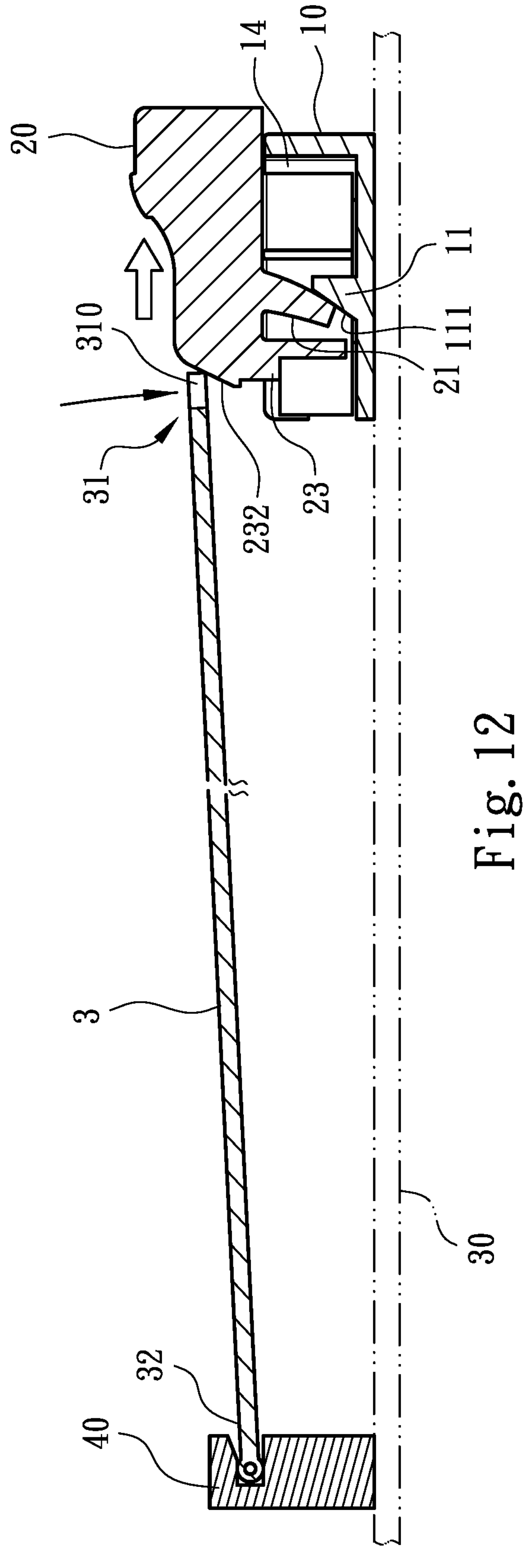
FIG. 12 is a second sectional side view showing the use of the electronic card retaining device according to the second embodiment of the present invention, wherein the electronic card pushes against the movable retaining member when being installed.

The install the electronic card 3 to the motherboard 30, first plug a pinned electrical connecting end 32 of the electronic card 3 into a terminal block 40 on the motherboard 30. At this point, an opposite end of the electronic card 3, i.e. an engaging end 31 provided with a locating notch 310, is kept in an elastically lifted state, and the movable retaining member 20 is located at an initial position 200 (i.e. at the retaining position without engaging or retaining the electronic card 3), as shown in FIG. 11. A user may directly press the electronic card 3 downward for the engaging end 31 to contact with the bevel surface 232 and slide downward gradually. Meanwhile, the bevel surface 232 brings the movable retaining member 20 to displace in a direction opposite to the electronic card 3 and toward the release position 201 until the locating protrusion 23 and the pressing section 231 of the movable retaining member 20 are displaced to a position close to or near the engaging end 31 of the electronic card 3 or an edge of the locating notch 310, as shown in FIG. 12.

While the movable retaining member 20 displaces gradually, the elastic arm 21 is elastically bent when it is finally in contact with and stopped by the bevel guide surface 111 of the stopper section 11 from moving any further. Meanwhile, the bent elastic arm 21 stores an elastic restoring force that allows the displaced movable retaining member 20 to return to the initial position 200. Since the horizontal guide grooves 252 on the mating guide section 25 are limited to displace only in a direction defined by the lateral extended sections 132 of the guide section 13, the movable retaining member 20 can move relative to the electronic card 3 only along the allowed displacement path between the retaining position 200 and the release position 201. A vertical elastic action force occurs when the elastic arm 21 is stopped from moving further by the bevel guiding surface 111 of the stopper section 11. This vertical elastic action force also enables the horizontal guide grooves 252 to move laterally closer to the lateral extended sections 132 and accordingly, effectively eliminates any possible loosened connection of the movable retaining member 20 to the seat 10.

When the electronic card 3 is kept pressed downward, the movable retaining member 20 is accordingly continuously displaced rearward relative to the seat 10 until the locating notch 310 on the electronic card 3 is engaged with the locating protrusion 23. At this point, the stored elastic restoring force of the elastic arm 21 enables the movable retaining member 20 to displace in a reverse direction toward the initial position 200 until the pressing section 231 is abutted on a location above the edge of the electronic card 3 having the locating notch 310, as shown in FIG. 13. Since the pressing section 231 is firmly abutted on the edge of the electronic card 3 having the locating notch 310, the electronic card 3 is retained in place by the pressing section 231. Besides, the engagement of the locating protrusion 23 with the locating notch 310 further provides a sideward stabilizing effect to the electronic card 3, so as to avoid any undesired sideward offset of the electronic card 3 relative to the movable retaining member 20 to cause any error in the electrical connection at the electrical connecting end 32 of the electronic card 3.

On the other hand, to release the electronic card 3 that has been retained to the motherboard 30, a force can be externally applied to the movable retaining member 20, such that the movable retaining member 20 is displaced from the retaining position 200 toward the release position 201. Meanwhile, the locating protrusion 23 and the pressing section 231 are moved out of the locating notch 301 of the electronic card 3, and an elastic force applied by the terminal block 40 to the electrical connecting end 32 brings the engaging end 31 of the electronic card 3 having the locating notch 310 provided thereat to elastically lift to a position at which the electronic card 3 can be easily removed from the movable retaining member 20, as shown in FIG. 14.

It is understood that in the practical implementation of the present invention, the stopper section 11 can be otherwise provided on the movable retaining member 20 while the elastic arm 21 is provided on the seat 10 corresponding to the stopper section 11 to achieve the above-described effect.

In conclusion, the electronic card retaining device according to the present invention indeed has the advantages of simplified structure, easy to mount, and reduced production cost to meet the requirements of novelty and improvement for granting a patent. It is also understood the present invention has been described with some preferred embodiments thereof and many changes and modifications in the described embodiments can be carried out without departing from the scope and the spirit of the invention that is intended to be limited only by the appended claims.

What is claimed is:

1. An electronic card retaining device, comprising:

a seat mounted on a motherboard;

a movable retaining member assembled to the seat; and a stopper section, an elastic arm located opposite to the stopper section, a guide section, and a mating guide section corresponding to the guide section provided between the seat and the movable retaining member; the mating guide section being engaged with the guide section to drive the movable retaining member to elastically displace between a retaining position and a release position relative to an electronic card; the elastic arm being integrally formed with one of the seat and the movable retaining member, and the stopper section being integrally formed with the other one of the seat and the movable retaining member;

wherein when the movable retaining member is subjected to an external force to move from an initial position, i.e. the retaining position, to the release position, the movable retaining member is brought to move out of the position capable of retaining the electronic card in place while the elastic arm is stopped by the stopper section to become elastically deformed and store an elastic restoring force; and wherein when the movable retaining member is released from the external fore applied thereto, the elastic arm is driven by the stored elastic restoring force to displace the movable retaining member from the release position back to the retaining position and retain the electronic card in place on the motherboard.

2. The electronic card retaining device as claimed in claim 1, wherein the stopper section is provided on one side facing toward the elastic arm with a bevel guiding surface.

3. The electronic card retaining device as claimed in claim 2, wherein the movable retaining member includes a receiving space for receiving the elastic arm and the stopper section therein; the mating guide section being two elongate guide slots located at two lateral sides of the receiving space, and the elongate guide slots being extended along an elastic displacement direction of the movable retaining member relative to the seat; the guide section being two elastic plates located at two lateral sides of the seat corresponding to the elongate guide slots, and the elastic plates respectively having a hooked portion correspondingly extending into the elongate guide slots; and the elongate guide slots guiding and limiting the hooked portions to displace in a predetermined direction and by a predetermined distance, such that the movable retaining member can be assembled and limited to the seat to move along an elastic displacement path.

4. The electronic card retaining device as claimed in claim 3, wherein the electronic card has two ends, one of which is an engaging end and the other of which is an electrical connecting end; the electrical connecting end being electrically connected to a terminal block provided on the motherboard, and the engaging end being provided on an edge thereof with a locating notch; the movable retaining member being provided on one side facing toward the electronic card with a locating protrusion corresponding to the locating notch and the locating protrusion having a pressing section provided above it and projecting toward the electronic card; and the pressing section having a bevel surface facing toward the locating notch of the electronic card.

5. The electronic card retaining device as claimed in claim 2, wherein the seat includes a receiving space for receiving the stopper section and the elastic arm therein; the guide section including two elongate lateral extended sections located at two lateral sides of the receiving space, and the lateral extended sections being extended along an elastic displacement direction of the movable retaining member relative to the seat and respectively having a projected section vertically extended downward from a middle section thereof; the mating guide section including two horizontal guide grooves provided on two lateral sides of the movable retaining member corresponding to the lateral extended sections, the two horizontal guide grooves respectively receiving one of the two lateral extended sections and having a vertically extended lower cut for receiving the projected sections therein, and the two lower cuts respectively having a width larger than that of the projected sections; such that the horizontal guide grooves form a displacement guide of the lateral extended section and the lower cuts limit a displacement distance of the projected sections, and the movable retaining member can be assembled and limited to the seat to move along an elastic displacement path.

6. The electronic card retaining device as claimed in claim 5, wherein the electronic card has two ends, one of which is an engaging end and the other of which is an electrical connecting end; the electrical connecting end being electrically connected to a terminal block provided on the motherboard, and the engaging end being provided on an edge thereof with a locating notch; the movable retaining member being provided on one side facing toward the electronic card with a locating protrusion corresponding to the locating notch and the locating protrusion having a pressing section provided above it and projecting toward the electronic card; and the pressing section having a bevel surface facing toward the locating notch of the electronic card.

7. The electronic card retaining device as claimed in claim 2, wherein the electronic card has two ends, one of which is an engaging end and the other of which is an electrical connecting end; the electrical connecting end being electrically connected to a terminal block provided on the motherboard, and the engaging end being provided on an edge thereof with a locating notch; the movable retaining member being provided on one side facing toward the electronic card with a locating protrusion corresponding to the locating notch and the locating protrusion having a pressing section provided above it and projecting toward the electronic card; and the pressing section having a bevel surface facing toward the locating notch of the electronic card.

8. The electronic card retaining device as claimed in claim 1, wherein the movable retaining member includes a receiving space for receiving the elastic arm and the stopper section therein; the mating guide section being two elongate guide slots located at two lateral sides of the receiving space, and the elongate guide slots being extended along an elastic displacement direction of the movable retaining member relative to the seat; the guide section being two elastic plates located at two lateral sides of the seat corresponding to the elongate guide slots, and the elastic plates respectively having a hooked portion correspondingly extending into the elongate guide slots; and the elongate guide slots guiding and limiting the hooked portions to displace in a predetermined direction and by a predetermined distance, such that the movable retaining member can be assembled and limited to the seat to move along an elastic displacement path.

9. The electronic card retaining device as claimed in claim 8, wherein the electronic card has two ends, one of which is an engaging end and the other of which is an electrical connecting end; the electrical connecting end being electrically connected to a terminal block provided on the motherboard, and the engaging end being provided on an edge thereof with a locating notch; the movable retaining member being provided on one side facing toward the electronic card with a locating protrusion corresponding to the locating notch and the locating protrusion having a pressing section provided above it and projecting toward the electronic card; and the pressing section having a bevel surface facing toward the locating notch of the electronic card.

10. The electronic card retaining device as claimed in claim 1, wherein the seat includes a receiving space for receiving the stopper section and the elastic arm therein; the guide section including two elongate lateral extended sections located at two lateral sides of the receiving space, and the lateral extended sections being extended along an elastic displacement direction of the movable retaining member relative to the seat and respectively having a projected section vertically extended downward from a middle section thereof; the mating guide section including two horizontal guide grooves provided on two lateral sides of the movable retaining member corresponding to the lateral extended sections, the two horizontal guide grooves respectively receiving one of the two lateral extended sections and having a vertically extended lower cut for receiving the projected sections therein, and the two lower cuts respectively having a width larger than that of the projected sections; such that the horizontal guide grooves form a displacement guide of the lateral extended section and the lower cuts limit a displacement distance of the projected sections, and the movable retaining member can be assembled and limited to the seat to move along an elastic displacement path.

11. The electronic card retaining device as claimed in claim 10, wherein the electronic card has two ends, one of which is an engaging end and the other of which is an electrical connecting end; the electrical connecting end being electrically connected to a terminal block provided on the motherboard, and the engaging end being provided on an edge thereof with a locating notch; the movable retaining member being provided on one side facing toward the electronic card with a locating protrusion corresponding to the locating notch and the locating protrusion having a pressing section provided above it and projecting toward the electronic card; and the pressing section having a bevel surface facing toward the locating notch of the electronic card.

12. The electronic card retaining device as claimed in claim 1, wherein the electronic card has two ends, one of which is an engaging end and the other of which is an electrical connecting end; the electrical connecting end being electrically connected to a terminal block provided on the motherboard, and the engaging end being provided on an edge thereof with a locating notch; the movable retaining member being provided on one side facing toward the electronic card with a locating protrusion corresponding to the locating notch and the locating protrusion having a pressing section provided above it and projecting toward the electronic card; and the pressing section having a bevel surface facing toward the locating notch of the electronic card.

* * * * *